United States Patent
Park et al.

(10) Patent No.: US 9,417,727 B2
(45) Date of Patent: Aug. 16, 2016

(54) TOUCHSCREEN DEVICE AND METHOD OF DRIVING THE SAME

(71) Applicant: Samsung Electro-Mechanics Co., Ltd., Suwon (KR)

(72) Inventors: Tah Joon Park, Suwon (KR); Jae Goon Aum, Suwon (KR); Hyun Jun Kim, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 291 days.

(21) Appl. No.: 14/082,616

(22) Filed: Nov. 18, 2013

(65) Prior Publication Data

US 2015/0070295 A1     Mar. 12, 2015

(30) Foreign Application Priority Data

Sep. 6, 2013   (KR) .......................... 10-2013-0107546

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0412* (2013.01)

(58) Field of Classification Search
CPC ............................... G06F 3/0412; G06F 3/044
See application file for complete search history.

(56) References Cited

U.S. PATENT DOCUMENTS

| 8,860,682 | B1 * | 10/2014 | Kremin | G06F 3/044 324/678 |
| 2010/0328259 | A1 | 12/2010 | Ishizaki et al. | |
| 2012/0066629 | A1 * | 3/2012 | Lee | G06F 3/04847 715/769 |
| 2012/0075240 | A1 * | 3/2012 | Kida | G06F 3/044 345/174 |
| 2014/0009428 | A1 * | 1/2014 | Coulson | G06F 3/044 345/174 |

FOREIGN PATENT DOCUMENTS

| KR | 10-2011-0001907 | 1/2011 |
| KR | 10-2011-0103790 | 9/2011 |
| KR | 10-2012-0073264 | 7/2012 |
| WO | WO 2011/027265 | 3/2011 |

* cited by examiner

*Primary Examiner* — Amare Mengistu
*Assistant Examiner* — Shawna Stepp Jones
(74) *Attorney, Agent, or Firm* — NSIP Law

(57) ABSTRACT

There are provided a touchscreen device and a method of driving the same. The touchscreen device includes: a panel unit including a plurality of first electrodes extending in a first direction and a plurality of second electrodes extending in a second direction; and a control unit applying predetermined driving signals to at least one first electrode among first electrodes arranged sequentially from a first thereof and to at least one first electrode among first electrodes arranged sequentially from a last thereof, and detecting a change in capacitance from at least one of the first electrodes among electrodes disposed in a central portion, to thereby determine a touch.

19 Claims, 6 Drawing Sheets

TOUCHSCREEN DEVICE AND METHOD OF DRIVING THE SAME

CROSS-REFERENCE TO RELATED APPLICATION

This application claims the benefit of Korean Patent Application No. 10-2013-0107546 filed on Sep. 6, 2013, with the Korean Intellectual Property Office, the disclosure of which is incorporated herein by reference.

BACKGROUND

The present disclosure relates to a touchscreen device and a method of driving the same.

A touchscreen device such as a touchscreen or a touchpad is a data input device attached to a display device so as to provide an intuitive user interface, and has recently been widely used in various electronic devices such as cellular phones, personal digital assistants (PDAs), and navigation devices. Particularly, as the demand for smartphones has been recently increased, touchscreens have been increasingly employed since they provide for various data input methods in a limited form factor.

Touchscreens used in portable devices may be mainly divided into resistive type touchscreens and capacitive type touchscreens, depending on the manner in which a touch is sensed thereby. Among these, capacitive type touchscreens have the advantages of a relatively long lifespan and ease of implementing various data input touches and gestures, and thus have been increasingly employed. In particular, capacitive type touchscreens allow for ease in the implementation of a multi-touch interface, as compared to resistive type touchscreens, and thus they are widely used in smartphones and the like.

The capacitive type touchscreen includes a plurality of electrodes having a predetermined pattern and the electrodes define a plurality of nodes in which changes in capacitance from a touch are generated. Nodes deployed in a two-dimensional plane generate a change in self-capacitance or a change in mutual-capacitance by a touch. Coordinates of the touch may be calculated by applying a weighted average calculation method or the like to a change in the capacitance generated at the nodes.

Patent Document 1 below discloses a touchscreen device that charges adjacent node capacitors with different voltages to differentiate the charges, thereby detecting a change in capacitance. However, Patent Document 1 does not teach determining a type of touch by a method of applying predetermined driving signals to outer electrodes among a plurality of electrodes extending in a single direction and detecting changes in capacitance from central electrodes.

RELATED ART DOCUMENT (Patent Document 1) Korean Patent Laid-Open Publication No. 10-2011-0103790

SUMMARY

An aspect of the present disclosure may provide a touchscreen capable of determining a touch by way of applying predetermined driving signals to outer electrodes among a plurality of electrodes extending in a single direction and detecting a change in capacitance from central electrodes.

According to an aspect of the present disclosure, a touchscreen device may include: a panel unit including a plurality of first electrodes extending in a first direction and a plurality of second electrodes extending in a second direction intersecting the first direction; and a control unit applying predetermined driving signals to at least one first electrode among first electrodes arranged sequentially from a first thereof and to at least one first electrode among first electrodes arranged sequentially from a last thereof, and detecting a change in capacitance from at least one of the first electrodes arranged in a central portion, to determine a touch, wherein a driving signal applied by the control unit to the at least one first electrode among first electrodes arranged sequentially from the first thereof and a driving signals applied by the control unit to the at least one first electrode among first electrodes arranged sequentially from the last thereof has a phase difference of 180 degree.

The control unit may create information on height of the touch based on the change in capacitance.

The control unit may determine a proximity touch based on the change in capacitance.

The control unit may determine a motion of the proximity touch in the second direction.

The control unit may maintain the first electrodes other than the at least one first electrode among first electrodes arranged sequentially from the first thereof, the at least one first electrode among first electrodes arranged sequentially from the last thereof and at least one of the first electrodes among electrodes disposed in the central portion, and the second electrodes in a floating state.

The control unit may include: a driving circuit unit applying different driving signals having a phase difference of 180 degrees to the at least one first electrode among first electrodes arranged sequentially from the first thereof and a driving signals applied by the control unit to the at least one first electrode among first electrodes arranged sequentially from the last thereof; and a sensing circuit unit detecting the change in capacitance from the at least one of the first electrodes among electrodes disposed in the central portion.

The control unit may include: a signal converting unit generating a digital signal based on the change in capacitance; and an operating unit determining a touch based on the digital signal.

According to another aspect of the present disclosure, a touchscreen device may include: a panel unit including a plurality of first electrodes extending in a first direction and a plurality of second electrodes extending in a second direction intersecting the first direction; and a control unit determining a touch from the first and second electrodes in a first mode and a second mode alternating therebetween regularly, wherein the control unit, in the first mode, applies predetermined driving signals to at least one first electrode among first electrodes arranged sequentially from a first thereof and to at least one first electrode among first electrodes arranged sequentially from a last thereof, and detects a change in capacitance from at least one of the first electrodes among electrodes disposed in a central portion, and, in the second mode, at least one of the second electrodes arranged sequentially from a first electrode among second electrodes to at least one of the second electrodes arranged sequentially from a last thereof, and detects a change in capacitance from at least one of the second electrodes arranged in a central portion.

The control unit, in the first mode, may apply different driving signals having a phase difference of 180 degrees to the at least one first electrode among first electrodes arranged sequentially from the first thereof and to at least one first electrode among first electrodes arranged sequentially from the last thereof, and, in the second mode, may apply different driving signals having a phase difference of 180 degrees to the at least one electrode among second electrodes arranged sequentially from the first thereof and to at least one electrode among second electrodes arranged sequentially from the last thereof.

The control unit may create information on height of the touch in the first and second modes.

The control unit may determine a proximity touch based on the change in capacitance in the first and second modes.

The control unit may determine a motion of the proximity touch in the second direction in the first mode and may determine a motion of the proximity touch in the first direction in the second mode.

The control unit, in the first mode, may maintain the first electrodes other than the at least one first electrode among first electrodes arranged sequentially from the first thereof, the at least one first electrode among first electrodes arranged sequentially from the last thereof and at least one of the first electrodes among electrodes disposed in the central portion, and the second electrodes in a floating state, and, in the second mode, may maintain the second electrodes other than the at least one electrode among second electrodes arranged sequentially from the first thereof, the at least one of the second electrodes arranged sequentially from the last one and at least one of the second electrodes arranged in the central portion, and the first electrodes in a floating state.

According to another aspect of the present disclosure, a method of driving a touchscreen may include: determining a motion of a touch in a second direction intersecting a first direction by applying different driving signals having a phase difference of 180 degrees to at least one of first electrodes arranged sequentially from a first one and to at least one first electrode among first electrodes arranged sequentially from a last thereof, and detecting a change in capacitance from at least one of the first electrodes among electrodes disposed in a central portion, the first electrodes extending in the first direction, and determining, in a second mode, the motion of the touch in the first direction by applying different signals having a phase difference of 180 degrees to at least one of second electrodes arranged sequentially from a first electrode among second electrodes to at least one of the second electrodes arranged sequentially from a last thereof, and detecting a change in capacitance from at least one of the second electrodes arranged in a central portion, the second electrodes extending in the second direction.

The determining of the motion of the touch in the first direction and the determining of the motion of the touch in the second direction may alternate therebetween regularly.

The touch may be a proximity touch.

The determining of the motion of the touch in the second direction may include maintaining the first electrodes other than the at least one first electrode among first electrodes arranged sequentially from the first thereof, the at least one first electrode among first electrodes arranged sequentially from the last thereof and at least one of the first electrodes among electrodes disposed in the central portion, and the second electrodes in a floating state.

The determining of the motion of the touch in the first direction may include maintaining the second electrodes other than the at least one electrode among second electrodes arranged sequentially from the first thereof, the at least one of the second electrodes arranged sequentially from the last one and at least one of the second electrodes arranged in the central portion, and the first electrodes in a floating state.

The first electrodes and the second electrodes may be insulated from one another.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
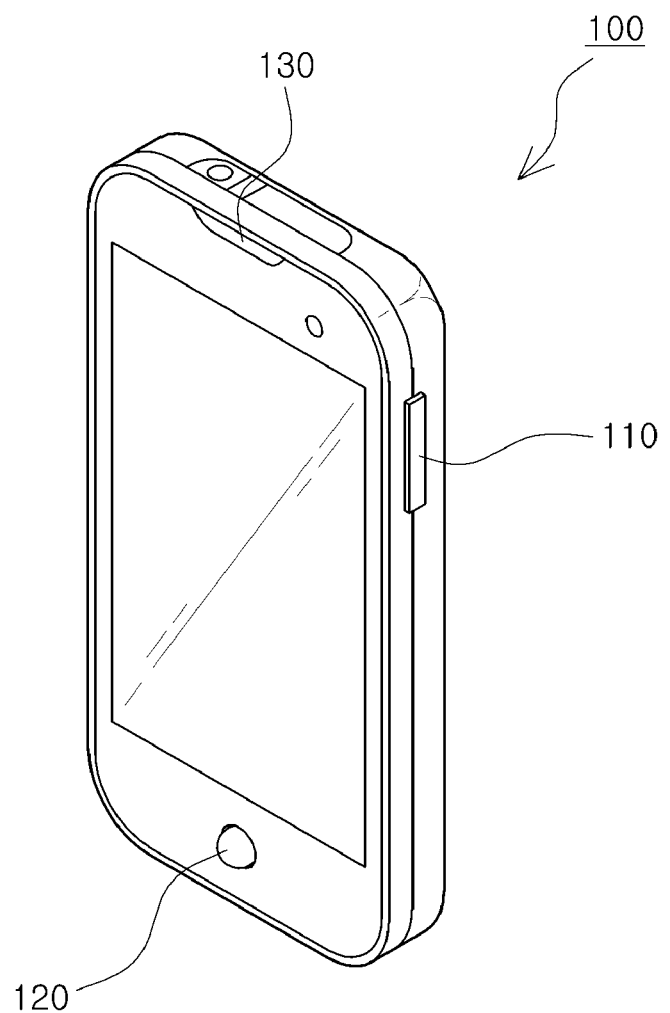
FIG. 1 is a perspective view showing an appearance of an electronic device including a touchscreen device according to an exemplary embodiment of the present disclosure.

FIG. 1 is a perspective view showing an appearance of an electronic device including a touchscreen device according to an exemplary embodiment of the present disclosure.

Referring to FIG. 1, the electronic device 100 according to the exemplary embodiment may include a display device 110 for displaying a screen, an input unit 120, an audio unit 130 for outputting a voice, and a touchscreen device integrated with the display device 110.

As shown in FIG. 1, it is common in mobile devices that a touchscreen device is integrated with a display device, and such a touchscreen device needs to have so high light transmittance that a screen displayed on the display device can be seen. Accordingly, such a touchscreen device may be implemented by forming an electrode with a conductive material on a transparent substrate formed of a film such as polyethylene terephthalate (PET), polycarbonate (PC), polyethersulfone (PES), polyimide (PI), polymethylmethacrylate (PMMA), and cyclo-olenfin polymer (COP), soda glass, or tempered glass. The conductive electrode may be formed of indium tin oxide (ITO), indium zinc oxide (IZO), zinc oxide (ZnO), carbon nano tube (CNT), or grapheme, for example. Further, the conductive electrode may be implemented by forming any one of Ag, Al, Cr, Ni, Mo and Cu or an alloy thereof as an invisible conductive fine lines. In a bezel area of the display device, wiring patterns connected to electrodes formed of a transparent, conductive material are arranged, and the wire patterns are shielded by the bezel area so that they are not visible.

Since the touchscreen device according to the exemplary embodiment is of a capacitive type, the touchscreen device may include a plurality of electrodes having a predetermined pattern. Further, the touchscreen device may include a capacitance sensing circuit to sense a change in the capacitance generated in the plurality of electrodes, an analog-digital converting circuit to convert an output signal from the capacitance sensing circuit into a digital value, and a calculating circuit to determine if a touch is made using the converted digital value.

Figure 2:
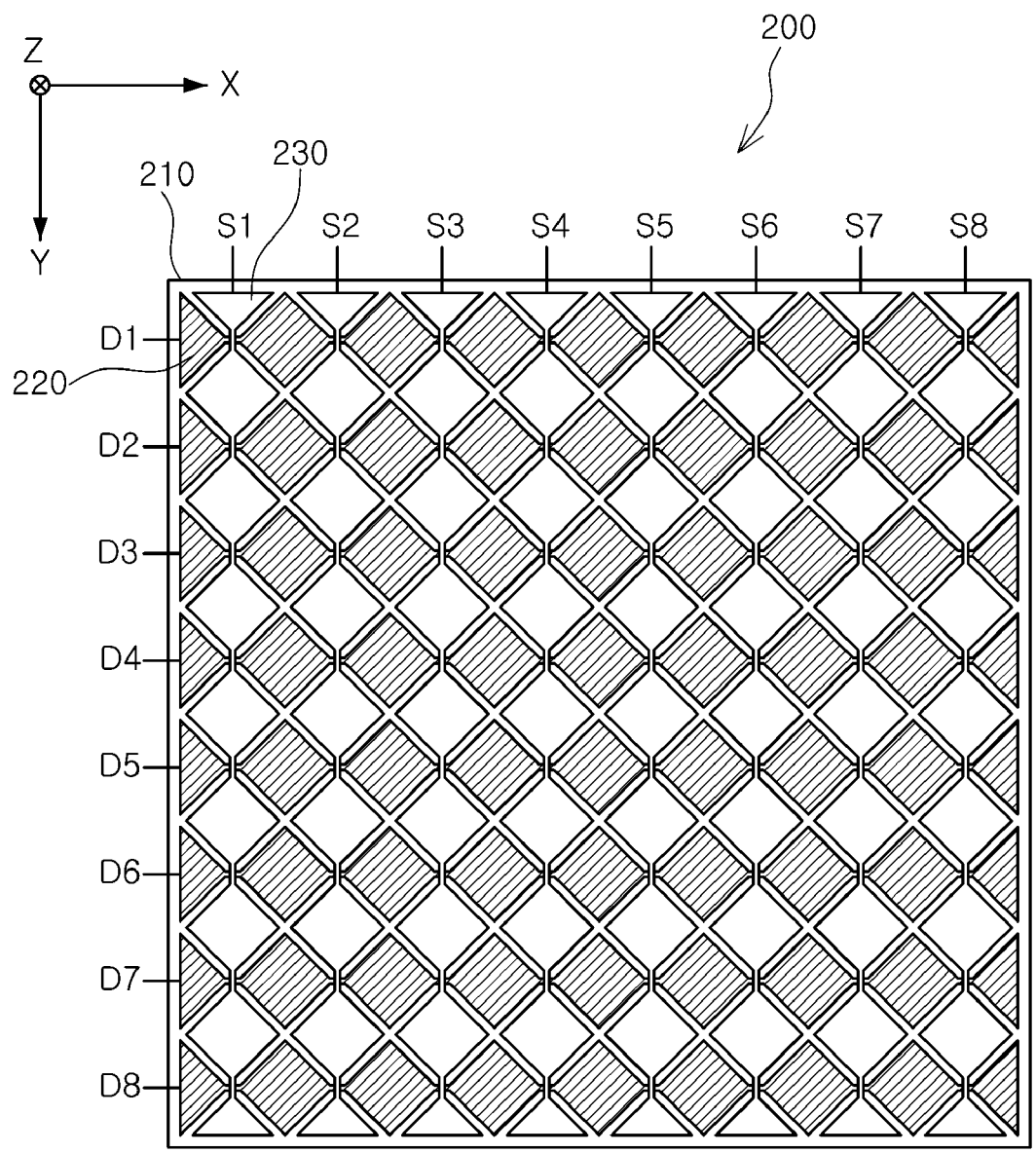
FIG. 2 is a view of a panel unit included in a touchscreen device according to an exemplary embodiment of the present disclosure.

FIG. 2 is a view of a panel unit included in a touchscreen device according to an exemplary embodiment of the present disclosure.

Referring to FIG. 2, the panel unit 200 according to the exemplary embodiment includes a substrate 210 and a plurality of electrodes 220 and 230 provided on the substrate 210. Although not shown in FIG. 2, each of the plurality of electrodes 220 and 230 may be electrically connected to a wiring pattern on a circuit board attached to one end of the substrate 210 through a wiring and a bonding pad. The circuit board may have a controller integrated circuit mounted thereon so as to detect a sensing signal generated in the plurality of electrodes 220 and 230, and may determine a touch based on the detected sensing signal.

In a touchscreen device, the substrate 210 may be a transparent substrate on which the plurality of electrodes 220 and 230 are formed. On the region in which wirings for connecting to the plurality of electrodes 220 and 230 are provided, other than the region in which the plurality of electrodes 220 and 230 are provided, a printed region may be formed on the substrate 210 so as to shield the wirings typically formed of an opaque metal material so that they are not visible.

The plurality of electrodes 220 and 230 may be formed on one surface or both surfaces of the substrate 210. Although the plurality of electrodes 220 and 230 are shown to have a lozenge- or diamond-shaped pattern in FIG. 2, it is apparent that the plurality of electrodes 220 and 230 may have a variety of polygonal shapes such as rectangles and triangles.

The plurality of electrodes 220 and 230 may include first electrodes 220 extending in the x-axis direction, and second electrodes 230 extending in the y-axis direction. The first electrodes 220 and the second electrodes 230 may be provided on both surfaces of the substrate 210 or may be provided on different substrates 210 such that they may intersect with each other. When all of the first electrodes 220 and the second electrodes 230 are provided on one surface of the substrate 210, a predetermined insulating layer may be partially formed at intersection points between the first electrodes 220 and the second electrodes 230.

The device, electrically connected to the plurality of electrodes 220 and 230 to sense a touch, detects a change in capacitance generated in the plurality of electrodes 220 and 230 by a touch, and senses the touch based on the detected change in capacitance. The first electrodes 220 may be connected to channels referred to as D1 to D8 in the controller integrated circuit to receive predetermined driving signals, and the second electrodes 230 may be connected to channels referred to as S1 to S8 in a controller integrated circuit to receive predetermined driving signals. In addition, channels D1 to D8 and S1 to S8 may be used when the controller integrated circuit detects sensing signals. The controller integrated circuit may acquire a change in capacitance generated among the first electrodes 220 and a change in capacitance generated among the second electrodes 230, to use them as sensing signals.

Figure 3:
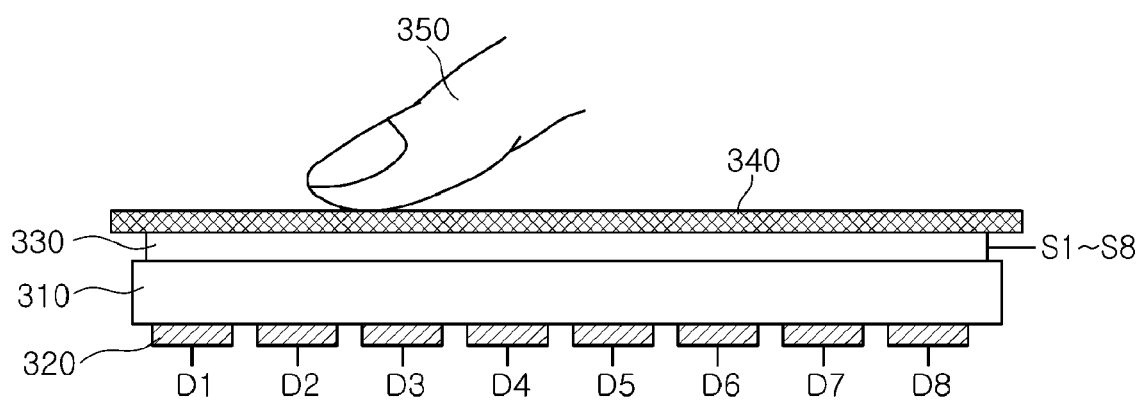
FIG. 3 is a cross-sectional view of the panel unit illustrated in FIG. 2.

FIG. 3 is a cross-sectional view of the panel unit illustrated in FIG. 2. FIG. 3 is a cross-sectional view of the panel unit 200 illustrated in FIG. 2 taken in the y-z plane, in which the panel unit 200 may further include a cover lens 340 that is touched, in addition to the substrate 310 and the plurality of electrodes 320 and 330 described above. The cover lens 340 is provided on the second electrodes 330 used in detecting sensing signals, to receive a touch from a touching object 350 such as a finger.

When a touching object 350 is located on or adjacent the cover lens 340, a change in capacitance may occur among the first electrodes 320 or among the second electrodes 330. The first electrodes 320 and the second electrodes 330 may be formed of a conductive material. If a voltage is applied to some of the first electrodes 320, then a capacitance is created between the some of the first electrodes 320 to which the voltage applied and the rest of the first electrodes 320. If a voltage is applied to some of the second electrodes 330, then a capacitance is created between the some of the second electrodes 330 to which the voltage applied and the rest of the second electrodes 330. A touch may be determined based on the capacitance varying with a touching object.

Figure 4:
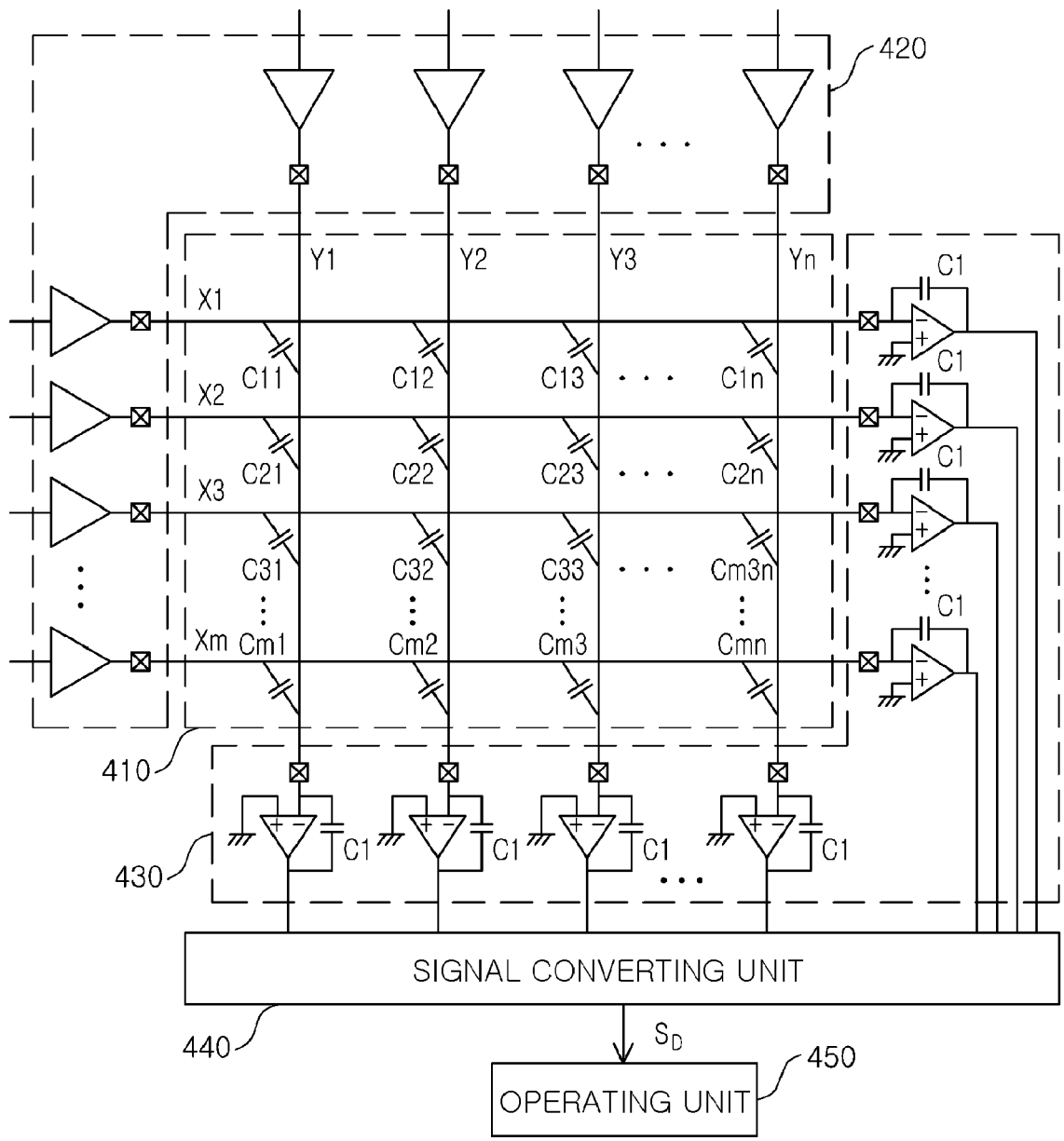
FIG. 4 is a view illustrating a touchscreen device according to an exemplary embodiment of the present disclosure.

FIG. 4 is a view illustrating a touchscreen device according to an exemplary embodiment of the present disclosure.

Referring to FIG. 4, the touchscreen device according to the exemplary embodiment may include a panel unit 410, a driving circuit unit 420, a sensing circuit unit 430, a signal converting unit 440, and an operating unit 450. The driving circuit unit 420, the sensing circuit unit 430, the signal converting unit 440, and the operating unit 450 may be implemented as a single controller integrated circuit (control circuit).

The panel unit 410 may include a plurality of first electrodes X1 to Xm extending in a first axis direction (that is, the horizontal direction of FIG. 4), and a plurality of second electrodes Y1 to Yn extending in a second axis direction (that is, the vertical direction of FIG. 4) crossing the first axis direction. At the intersection points of the first electrodes X1 to Xm and the second electrodes Y1 to Yn, node capacitors are formed. In FIG. 4, a node capacitor denoted by Cmn refers to a node capacitor formed by the $m^{th}$ first electrode and the $n^{th}$ second electrode.

The driving circuit unit 420 may apply predetermined driving signals to the first electrodes X1 to Xm and to the second electrodes Y1 to Yn of the panel unit 510. The driving signals may be square wave signals, sine wave signals, triangle wave signals, or the like, having predetermined periods and amplitudes. Although circuits for generating and applying the driving signals are individually connected to the plurality of first and second electrodes X1 to Xm and Y1 to Yn in FIG. 4, it is apparent that a single driving signal generating circuit may be used to apply the driving signals to the plurality of first electrodes by employing a switching circuit.

The sensing circuit unit 430 may be connected to the plurality of first and second electrodes X1 to Xm and Y1 to Yn to detect a change in capacitance. The sensing circuit unit 430 may include an integration circuit to sense a change in capacitance. The integrating circuit may include at least one operational amplifier and a capacitor C1 having a predetermined capacitance, and the operational amplifiers has an inverting input connected to the second electrodes to convert the change in capacitance into analog signals in the form of voltage, for example, and then output the analog signals.

The signal converting unit 440 may generate a digital signal $S_D$ from the analog signals generated by the integration circuit. For example, the signal converting unit 440 may include a time to digital converter (TDC) circuit measuring a time in which the analog signals in the form of voltage output from the sensing circuit unit 430 reach a predetermined reference voltage level to convert the measured time into the digital signal $S_D$, or an analog to digital converter (ADC) circuit measuring an amount by which a level of the analog signals output from the sensing circuit unit 430 is changed for a predetermined time to convert the changed amount into the digital signal $S_D$.

The operating unit 450 may create sensing data using the digital signal $S_D$ to determine if a touch is received on the panel unit 410 based on the digital signal $S_D$.

Figure 5:
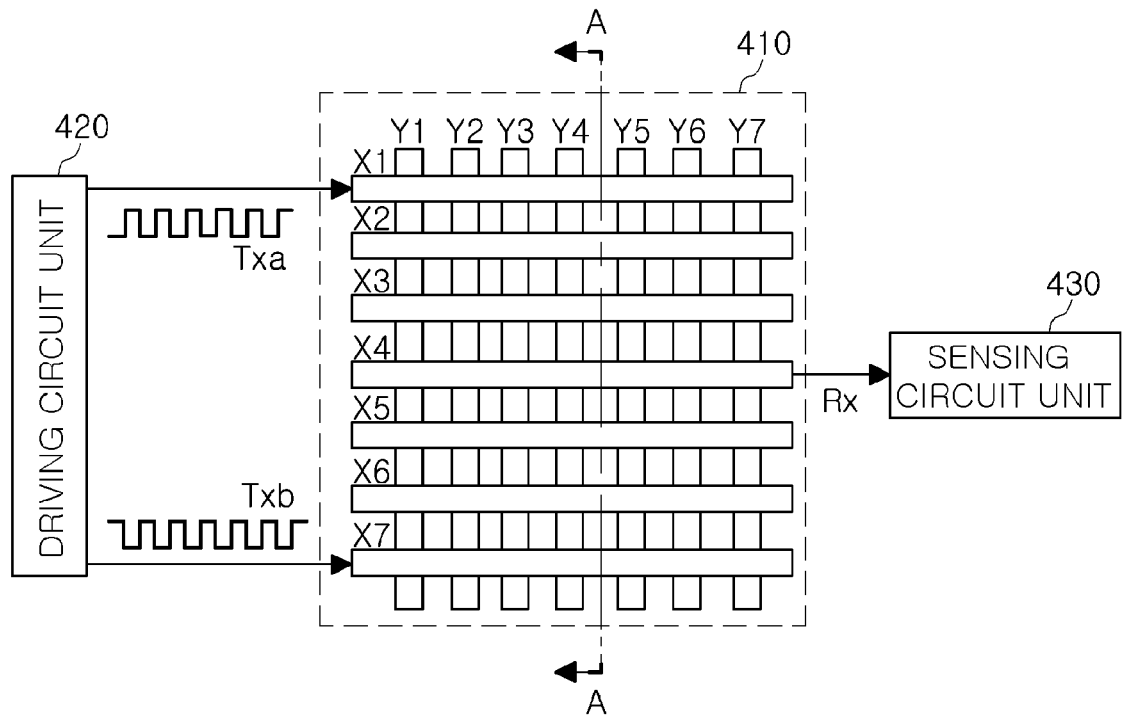
FIG. 5 is a view schematically illustrating a touchscreen device according to the exemplary embodiment in FIG. 4.
Figure 6:
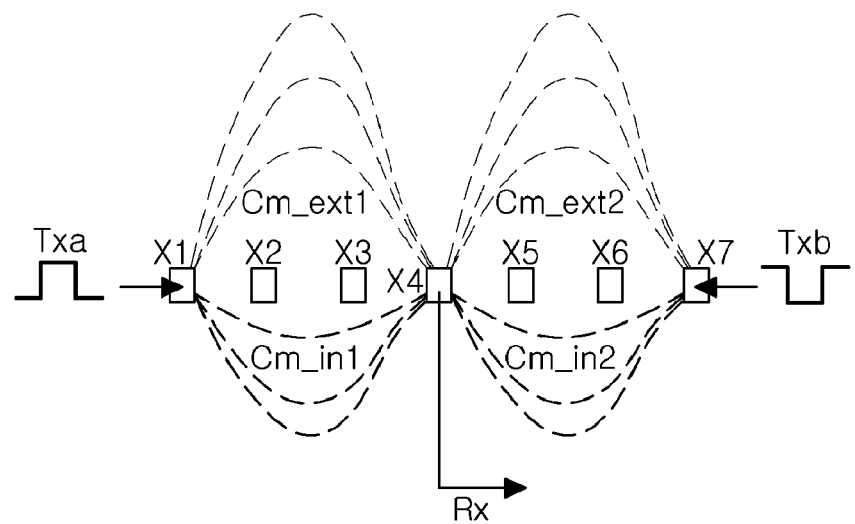
FIG. 6 is a view illustrating a capacitance component created in the cross section taken along line A-A' in FIG. 5.
Figure 7:
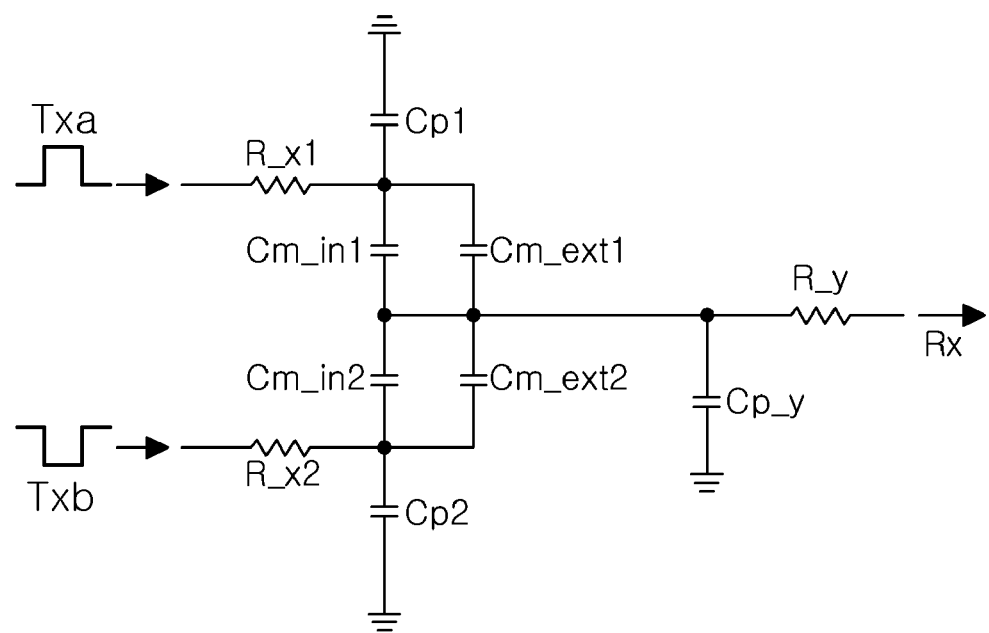
FIG. 7 is an equivalent circuit diagram of the capacitance component in FIG. 6.

FIG. 5 is a view schematically illustrating a touchscreen device according to the exemplary embodiment in FIG. 4; FIG. 6 is a view illustrating a capacitance component created in the cross section taken along line A-A' in FIG. 5; and FIG. 7 is an equivalent circuit diagram of the capacitance component in FIG. 6. Hereinafter, a method of operating a touchscreen device according to the exemplary embodiment will be described with reference to FIGS. 5 to 7.

Unlike FIG. 5, the panel unit 410 in FIG. 5 has only seven first electrodes X1 to X7 and seven second electrode Y1 to Y7, it is apparent that the numbers of the first and second electrodes is not limited thereto.

The driving circuit unit 420 may apply a driving signal Txa to the first electrode X1, the first of the first electrodes, and may apply a driving signal Txb to the last electrode X7, the last of the first electrodes. The driving signals Txa and Txb may have the same frequency and amplitude but may have a phase difference of 180 degrees. By setting the phase difference of 180 degrees between the driving signal Txa applied to X1, the first of the first electrodes and the driving signal Txb applied to the X7, the seventh of the first electrodes, the capacitance of the capacitor (C1 in FIG. 4) provided in the integration circuit of the sensing circuit unit 420 may be reduced.

The sensing circuit unit 430 may detect a change in capacitance from X4, the fourth of the first electrodes located in the middle. That is, the sensing circuit unit 430 may detect a change in capacitance between X1, the first and X4, the fourth of the first electrodes, and a change in capacitance between X4, the fourth and the X7, the seventh of the first electrodes.

In FIG. 5, the driving circuit unit 420 applies driving signals to X1, the first and the last one X7 of the first electrodes. However, exemplary embodiments of the present disclosure are not limited thereto but the driving circuit unit 420 may apply driving signals Txa and Txb to several electrodes arranged sequentially from the first of the first electrodes and to several electrodes arranged sequentially from the last of the first electrodes.

Similarly, although the sensing circuit unit 430 detects a change in capacitance from X1, the first of the first electrodes located in the middle in FIG. 5, the sensing circuit unit 430 may also detect a change in capacitance from several electrodes located in the middle of the first electrodes.

For example's sake, the case in which the driving signal Txa is applied to X1, the first of the first electrodes and the driving signals Txb is applied to the seventh of the first electrode. Further, it is also assumed that a change in capacitance is detected from X4, the fourth of the first electrodes.

In FIG. 6, the second electrodes Y1 to Y7 shown in FIG. 5 are omitted for the sake of convenience and only the first electrodes X1 to X7 are illustrated.

Referring to FIG. 6, the driving signals Txa and Txb are applied to X1 and X2, first and second of the first electrodes, respectively, and a change in capacitance is detected from X4, the fourth of the first electrodes. Accordingly, a capacitance Cm_in1 is created between X1, the first and X4, the fourth of the first electrodes in the inner direction of the touch panel, and a capacitance Cm_ext1 is created in the outer direction of the touch panel (in the direction the cover lens is arranged) Similarly, It can be seen that a capacitance Cm_in2 is created between X4, the fourth and the X7, the seventh of the first electrodes in the inner direction of the touch panel, and a capacitance Cm_ext2 is created in the outer direction of the touch panel.

Referring to FIG. 7, as shown in FIG. 6, the capacitances Cm_in1 and Cm_ext1 are formed in parallel, and the capacitances Cm_in2 and Cm_ext2 are formed in parallel. The capacitance Cp1 corresponds to a parasitic capacitance formed between X1, the first of the first electrodes and a ground, capacitance Cp2 corresponds to a parasitic capacitance formed between the X7, the seventh of the first electrodes and the ground, and capacitance Cp_y corresponds to a parasitic capacitance formed between X4, the fourth of the first electrodes and the ground. In addition, the resistances R_x1, R_x2, and R_y correspond to parasitic resistance components of the X1, X7 and X4 of the first electrodes, respectively.

Generally, the capacitances Cm_in1 and Cm_in2 are formed tens of times larger than the capacitances Cm_ext1 and Cm_ext2. According to the touchscreen device of the exemplary embodiment, a type of touch may be determined based on the amount of a change in capacitance. For example, if the amount of a change in capacitance is small, it is determined that a proximity touch has been made, and if the amount of a change in capacitance is large, it is determined that a normal touch has been made. Moreover, when an proximity touch is input, height information on the adjacent touch may be created according to the amount of the change in capacitance.

The touchscreen device according to the exemplary embodiment, when the driving signal Txa is applied to X1, the first of the first electrodes, the driving signal Txb is applied to the X7, the seventh of the first electrodes, and a change in capacitance is detected from X4, the fourth of the first electrode, may maintain X2, X3, X5 and X6 of the first electrodes and the second electrodes Y1 to Y7, other than X1, X4 and X7 of the first electrodes, in a floating state.

That is, by maintaining the X2, X3, X5 and X6 of the first electrodes and the second electrodes Y1 to Y7 in a floating state, the capacitance Cm_in1 between X1, the first and X4, the fourth of the first electrodes and the capacitance Cm_in2 between X4, the fourth and the X7, the seventh of the first electrodes become larger, so that an proximity touch such as a hovering touch may be detected more precisely.

Further, the touchscreen device according to the exemplary embodiment, when the driving signal Txa is applied to X1, the first of the first electrodes, the driving signal Txb is applied to the X7, the seventh of the first electrodes, and a change in capacitance is detected from X4, the fourth of the first electrode, may compare changes in the capacitances Cm_in1 and Cm_ext1 between X1, the first and X4, the fourth of the first electrodes with changes in the capacitances Cm_in2 and Cm_ext2 between X4, the fourth and the X7, the seventh of the first electrodes, thereby determining a motion of a touch in the second direction intersecting the first direction in which the first electrodes are extended.

In the foregoing description, a touch is determined using the first electrodes according to the exemplary embodiment. However, it is apparent that a proximity touch may be determined using the second electrodes in a similar manner.

A mode in which a touch is determined using the first electrodes as described above is defined as a first mode, and a mode in which a touch is determined using the second electrodes is defined as a second mode. Thus, the touchscreen according to the exemplary embodiment of the present disclosure may determine a touch in the first and second modes alternating regularly.

As set forth above, according to exemplary embodiments of the present disclosure, predetermined driving signals are applied to outer electrodes located among a plurality of electrodes extending in a single direction and a change in capacitance is detected from electrodes located in middle central portion, so that a proximity touch, such as a hovering touch, may be precisely determined.

In addition, different driving signals having a phase difference of 180 degrees are applied to some of electrodes located on outer sides among a plurality of electrodes extending in a direction, so that capacity of a capacitor for detecting a change in capacitance may be reduced.

While exemplary embodiments have been shown and described above, it will be apparent to those skilled in the art that modifications and variations could be made without departing from the spirit and scope of the present disclosure as defined by the appended claims.

What is claimed is:

1. A touchscreen device, comprising: a panel unit comprising first electrodes extending in a first direction, and second electrodes extending in a second direction intersecting the first direction; and a control unit configured to apply predetermined driving signals to a first electrode among first electrodes arranged sequentially from an initial one thereof, and to a first electrode among first electrodes arranged sequentially from a last one thereof, and detect a change in capacitance from a first electrode among electrodes disposed in a central portion disposed between the first electrode among first electrodes arranged sequentially from the initial one thereof and the first electrode among first electrodes arranged sequentially from the last one thereof, to determine a touch, wherein the control unit is configured to apply a driving signal to the first electrode among first electrodes arranged sequentially from the initial one thereof, and wherein driving signals applied by the control unit have a phase difference of 180 degrees.

2. The touchscreen device of claim 1, wherein the control unit is configured to create information on height of the touch, based on the change in capacitance.

3. The touchscreen device of claim 1, wherein the control unit is configured to determine a proximity touch, based on the change in capacitance.

4. The touchscreen device of claim 3, wherein the control unit is configured to determine a motion of the proximity touch in the second direction.

5. The touchscreen device of claim 1, wherein the control unit is configured to maintain the following in a floating state: the first electrodes other than the first electrode among first electrodes arranged sequentially from the initial one thereof, the first electrode among first electrodes arranged sequentially from the last one thereof and a first electrode among electrodes disposed in the central portion, and the second electrodes.

6. The touchscreen device of claim 1, wherein the control unit comprises: a driving circuit unit configured to apply driving signals having a phase difference of 180 degrees to the first electrode among first electrodes arranged sequentially from the initial one thereof, and to apply driving signals applied by the control unit to the first electrode among first electrodes arranged sequentially from the last one thereof; and a sensing circuit unit configured to detect the change in capacitance from the first electrode among electrodes disposed in the central portion.

7. The touchscreen device of claim 6, wherein the control unit comprises: a signal converting unit configured to generate a digital signal based on the change in capacitance; and an operating unit configured to determine a touch, based on the digital signal.

8. A touchscreen device, comprising: a panel unit comprising first electrodes extending in a first direction, and second electrodes extending in a second direction intersecting the first direction; and a control unit configured to determine a touch from the first and second electrodes alternating regularly between a first mode and a second mode, wherein in the first mode, the control unit is configured to apply predetermined driving signals to a first electrode among first electrodes arranged sequentially from an initial one thereof, and to a first electrode among first electrodes arranged sequentially from a last one thereof, wherein the driving signals applied by the control unit have a phase difference of 180 degrees, and detect a change in capacitance from a first electrode among electrodes disposed in a first central portion disposed between the first electrode among first electrodes arranged sequentially from the initial one thereof and the first electrode among first electrodes arranged sequentially from the last one thereof, and, wherein in the second mode, the control unit is configured to apply predetermined driving signals to a second electrode arranged sequentially from an initial electrode among second electrodes to a second electrode arranged sequentially from a last one thereof, wherein the driving signals applied by the control unit have a phase difference of 180 degrees, and detect a change in capacitance from a second electrode arranged in a second central portion disposed between the second electrode among second electrodes arranged sequentially from the initial one thereof and the second electrode among second electrodes arranged sequentially from the last one thereof.

9. The touchscreen device of claim 8, wherein in the first mode, the control unit is configured to apply driving signals having a phase difference of 180 degrees to the first electrode among first electrodes arranged sequentially from the initial one thereof, and to a first electrode among first electrodes arranged sequentially from the last one thereof, and, wherein in the second mode, the control unit is configured to apply driving signals having a phase difference of 180 degrees to the electrode among second electrodes arranged sequentially from the initial one thereof, and to a second electrode among second electrodes arranged sequentially from the last one thereof.

10. The touchscreen device of claim 8, wherein the control unit is configured to create information on height of the touch in the first and second modes.

11. The touchscreen device of claim 10, wherein the control unit is configured to determine a proximity touch, based on the change in capacitance in the first and second modes.

12. The touchscreen device of claim 11, wherein in the first mode, the control unit is configured to determine a motion of the proximity touch in the second direction, and wherein in the second mode, the control unit is configured to determine a motion of the proximity touch in the first direction.

13. The touchscreen device of claim 8, wherein in the first mode, the control unit is configured to maintain the following in a floating state: the first electrodes other than the first electrode among first electrodes arranged sequentially from the initial one thereof, the first electrode among first electrodes arranged sequentially from the last one thereof and a first electrode among electrodes disposed in the central portion disposed between a first electrode among first electrodes arranged sequentially from the initial one thereof and a first electrode among first electrodes arranged sequentially from the last one thereof, and the second electrodes, and, wherein in the second mode, the control unit is configured to maintain the following in a floating state: the second electrodes other than the electrode among second electrodes arranged sequentially from the initial one thereof, the second electrode arranged sequentially from the last one and a second electrode arranged in the central portion, and the first electrodes.

14. A method of driving a touchscreen, comprising: in a first mode, determining a motion of a touch in a second direction intersecting a first direction, by applying driving signals having a phase difference of 180 degrees from a control unit to a first electrode arranged sequentially from an initial one thereof, and to a first electrode among first electrodes arranged sequentially from a last one thereof, and detecting a change in capacitance from a first electrode among electrodes disposed in a first central portion disposed between the first electrode among first electrodes arranged sequentially from the initial one thereof and the first electrode among first electrodes arranged sequentially from the last one thereof; and in a second mode, determining the motion of the touch in the first direction, by applying signals having a phase difference of 180 degrees from a control unit to a second electrode arranged sequentially from an initial electrode among second electrodes to a second electrode arranged sequentially from a last one thereof, and detecting a change in capacitance from a second electrode arranged in a second central portion disposed between the second electrode among second electrodes arranged sequentially from the initial one thereof and the second electrode among second electrodes arranged sequentially from the last one thereof; wherein the first electrodes extend in the first direction, and the second electrodes extend in the second direction.

15. The method claim 14, wherein the determining of the motion of the touch in the first direction alternates regularly with the determining of the motion of the touch in the second direction.

16. The method claim 15, wherein the touch is a proximity touch.

17. The method of claim 14, wherein the determining of the motion of the touch in the second direction comprises maintaining the following in a floating state: the first electrodes other than the first electrode among first electrodes arranged sequentially from the initial one thereof, the first electrode among first electrodes arranged sequentially from the last one thereof and a first electrode among electrodes disposed in the central portion, and the second electrodes.

18. The method of claim 14, wherein the determining of the motion of the touch in the first direction comprises maintaining the following in a floating state: the second electrodes other than the electrode among second electrodes arranged sequentially from the initial one thereof, the second electrode arranged sequentially from the last one and a second electrode arranged in the central portion, and the first electrodes.

19. The method of claim 14, wherein the first electrodes are insulated from the second electrodes.

\* \* \* \* \*